July 15, 1952 B. C. COONS 2,603,331
PEAR FEEDING AND ORIENTING APPARATUS
Original Filed Dec. 5, 1944 6 Sheets-Sheet 3

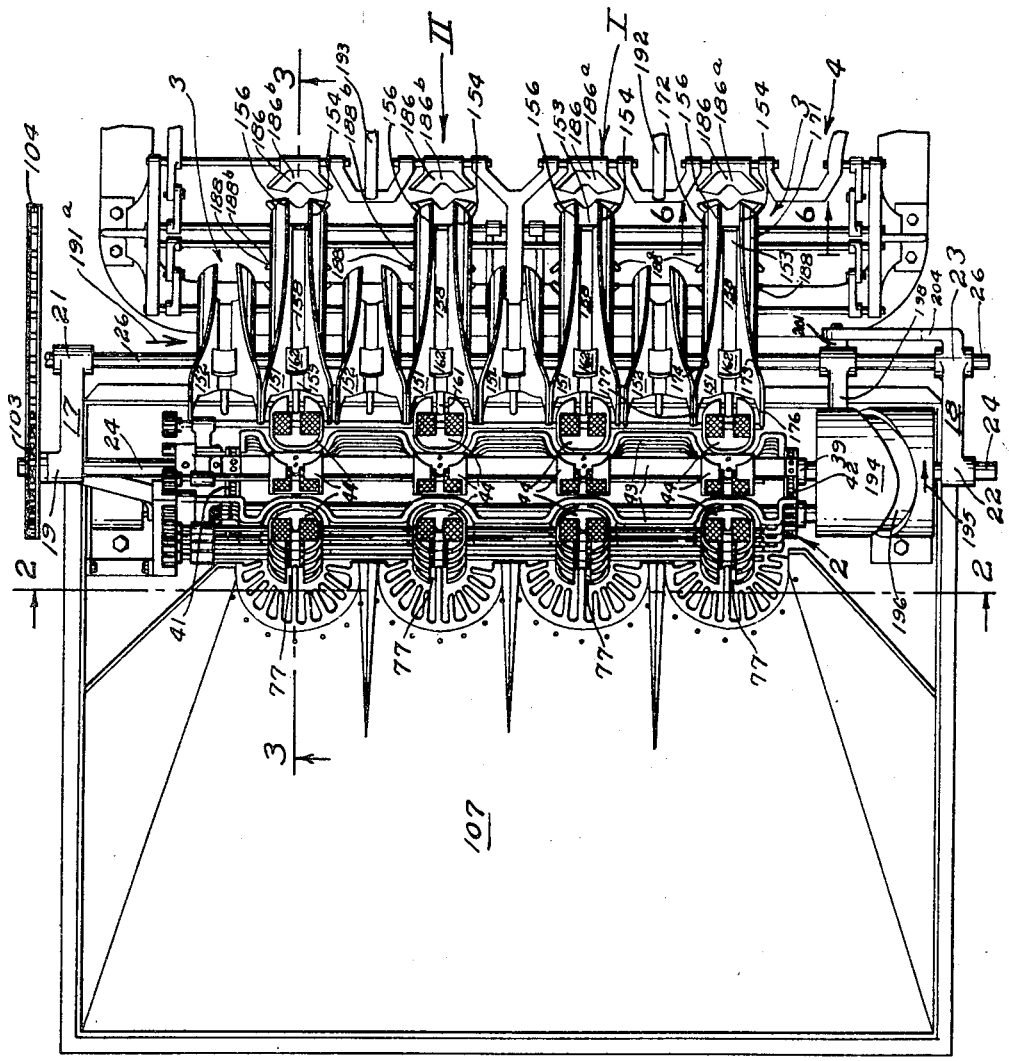

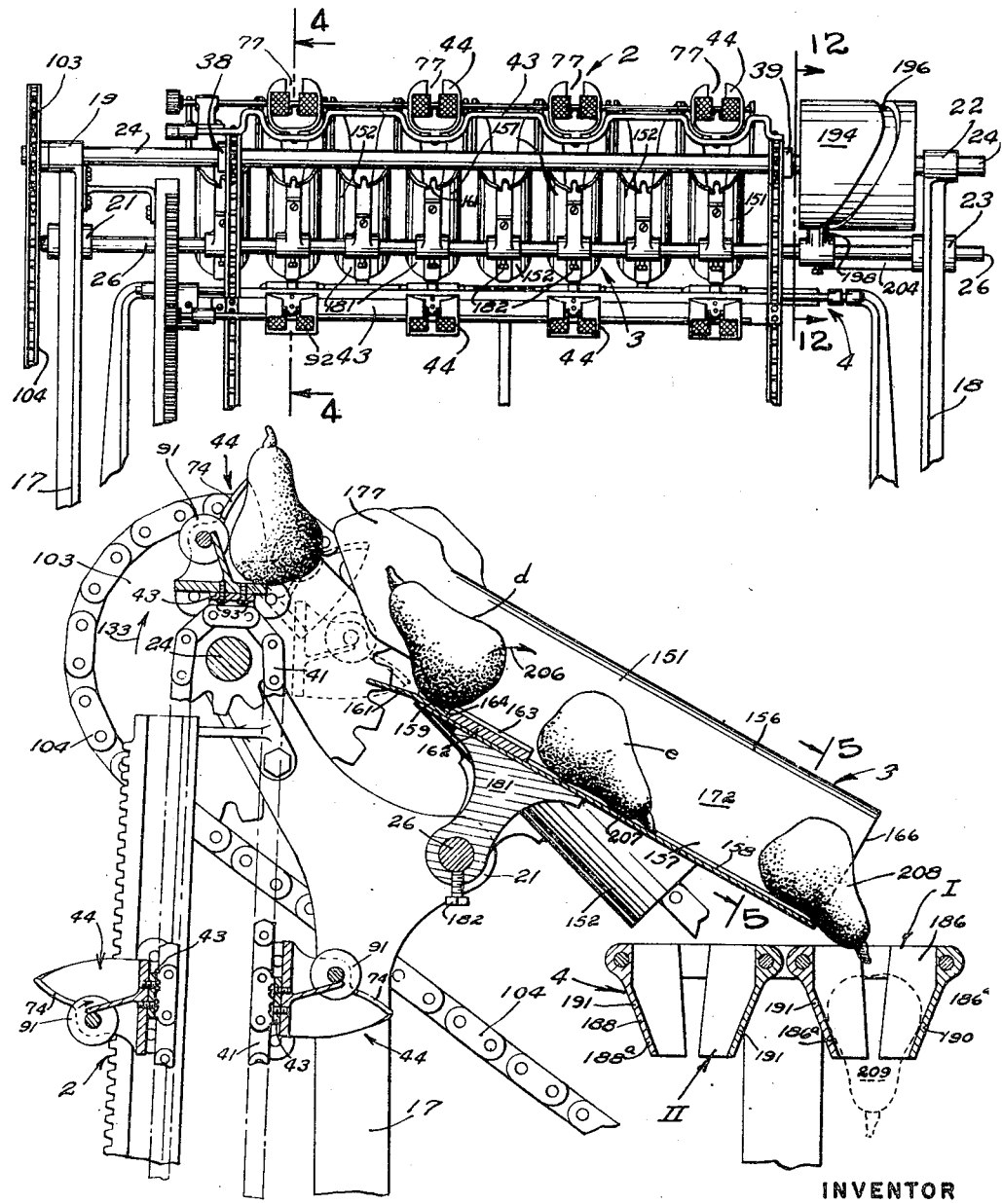

INVENTOR
BURTON C. COONS
BY Philip G. Minnis
Hans G. Hoffmeister
ATTORNEYS

July 15, 1952 B. C. COONS 2,603,331
PEAR FEEDING AND ORIENTING APPARATUS
Original Filed Dec. 5, 1944 6 Sheets-Sheet 4
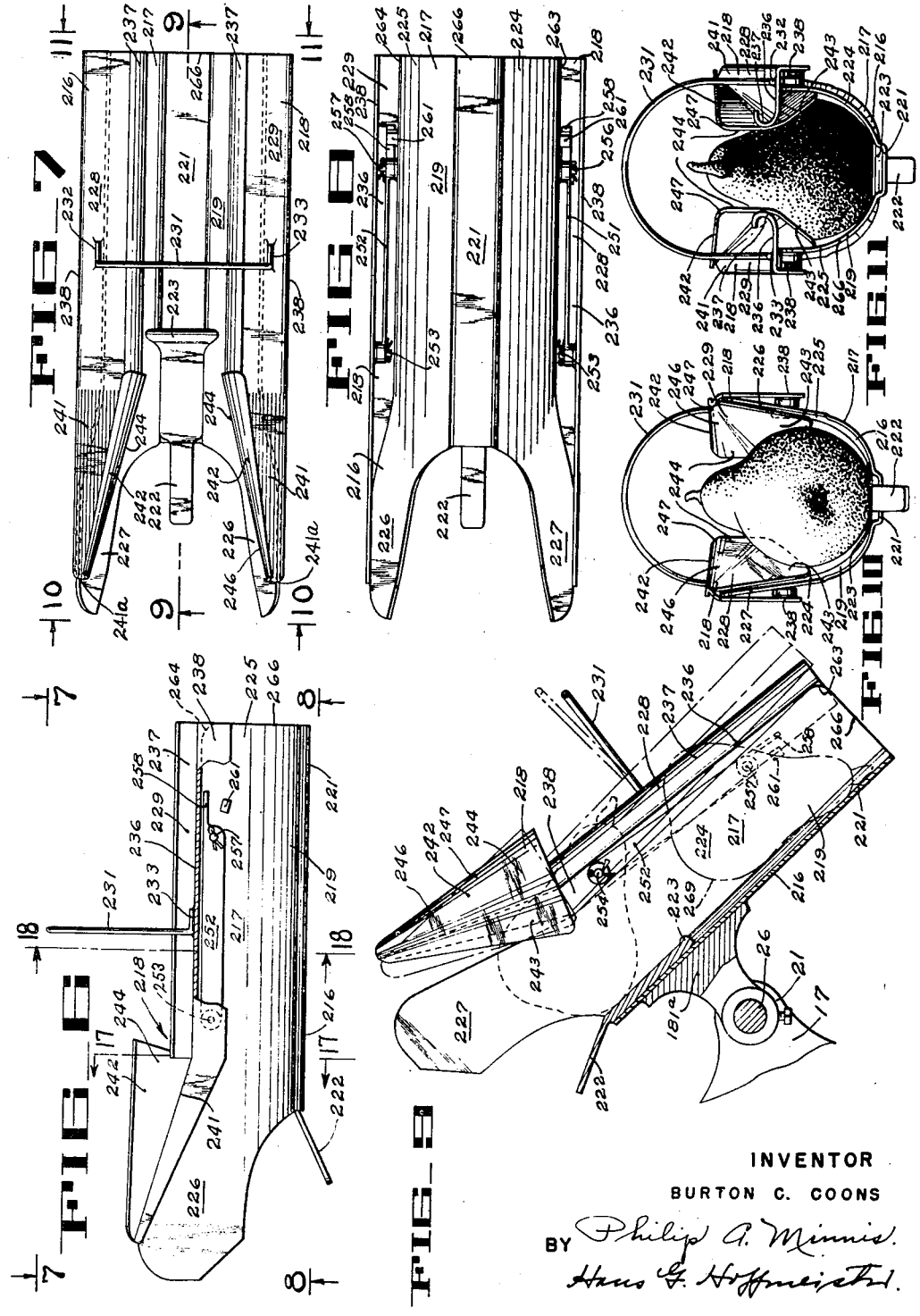
INVENTOR
BURTON C. COONS
BY Philip G. Minnis
Hans G. Hoffmeister
ATTORNEYS July 15, 1952     B. C. COONS     2,603,331
PEAR FEEDING AND ORIENTING APPARATUS
Original Filed Dec. 5, 1944     6 Sheets-Sheet 5
FIG_14
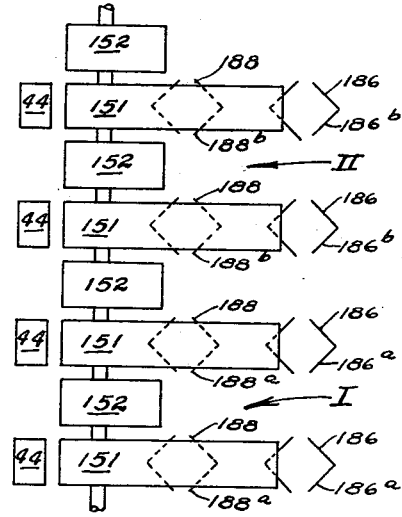
FIG_15
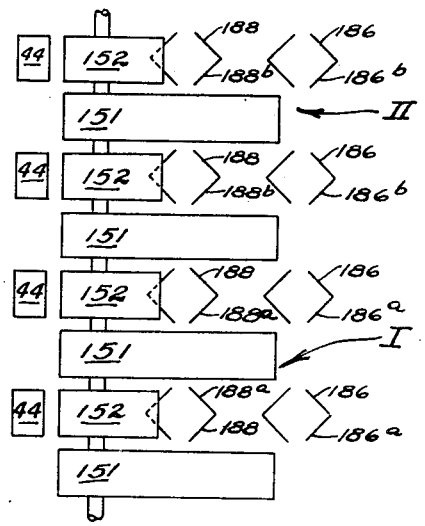
FIG_13
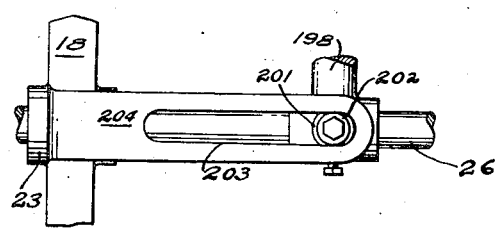
FIG_12
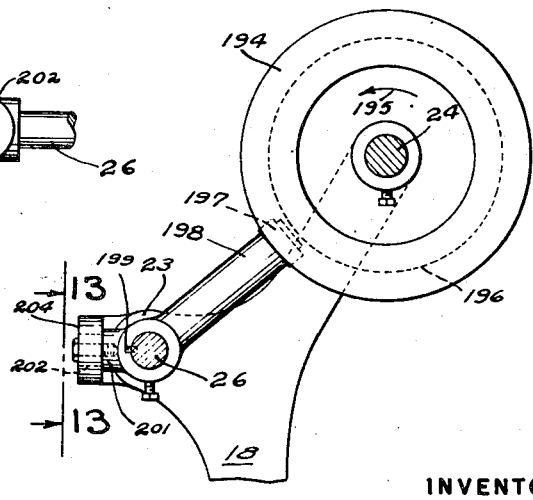
INVENTOR
BURTON C. COONS
BY Philip A. Minnis
Hans G. Hoffmeister
ATTORNEYS

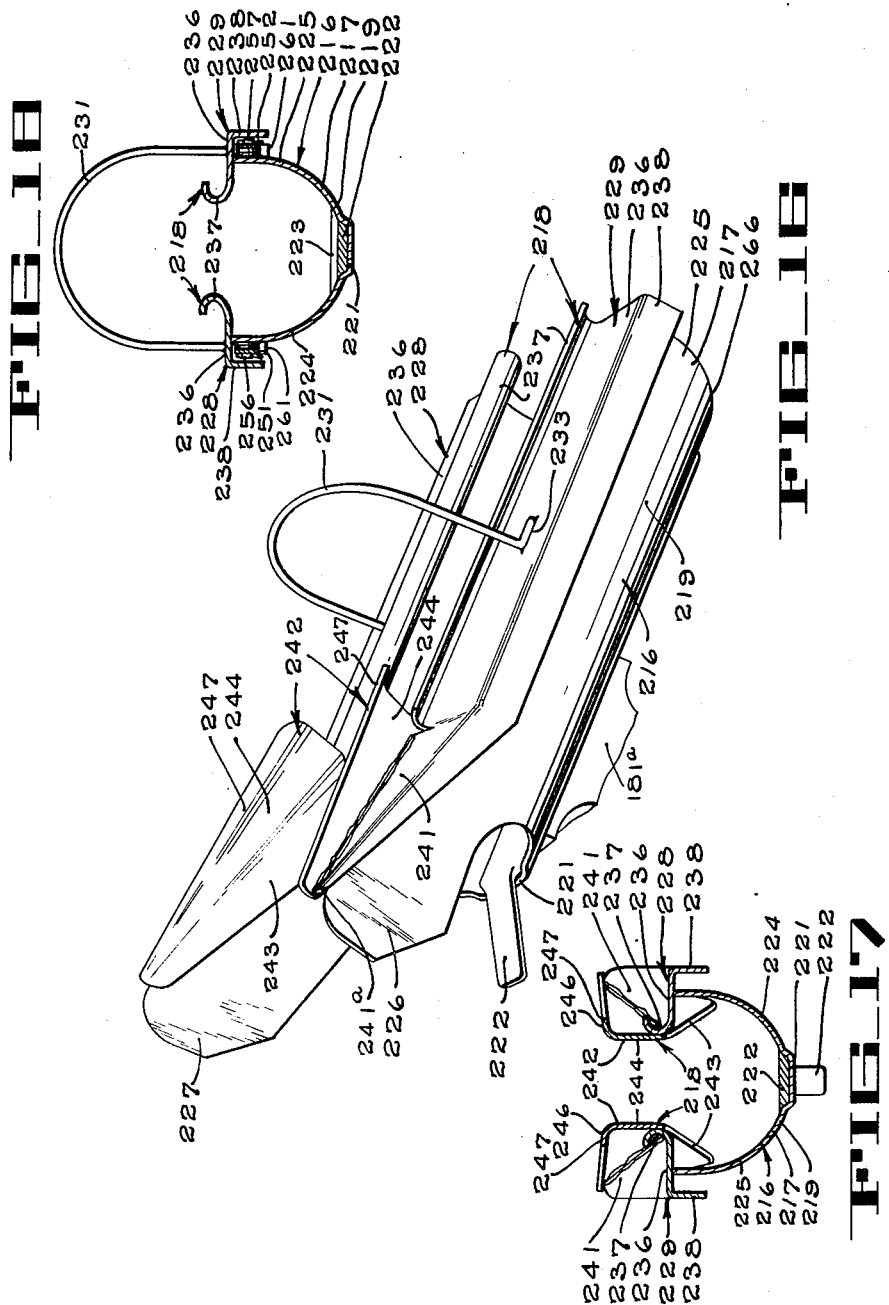

Patented July 15, 1952

2,603,331

UNITED STATES PATENT OFFICE 2,603,331

PEAR FEEDING AND ORIENTING APPARATUS

Burton C. Coons, San Jose, Calif., assignor to Food Machinery and Chemical Corporation, a corporation of Delaware Original application December 5, 1944, Serial No. 566,694, now Patent No. 2,581,634, dated January 8, 1952. Divided and this application July 19, 1947, Serial No. 762,113

6 Claims. (Cl. 193—43)

The present invention is concerned with certain new and useful improvements in apparatus for orienting and feeding fresh pears.

This application is a division of my copending application, Serial No. 566,694, filed December 5, 1944, now Patent No. 2,581,634, issued January 8, 1952, for Pear Feeding and Orienting Apparatus.

One object of the present invention is to provide a pear orienting and feeding apparatus of simple and inexpensive construction which requires a minimum amount of floor space.

It is also an object of the invention to provide a pear orienting and feeding apparatus which is adapted for handling pears of all sizes and configuration and in which the orientation of the pears is automatically controlled in accordance with the size of the fruit.

Another object of the invention is to provide a pear orienting and feeding apparatus of large capacity and efficient operation.

Other objects and advantages of the invention will become apparent from the following description and the accompanying drawings in which:

Fig. 1 is a plan view of the pear feeding and orienting mechanism of the present invention in conjunction with a pear feeding or transfer unit of a pear preparation machine.

Fig. 2 is a front elevation of the upper portion of the machine shown in Fig. 1 taken along line 2—2 thereof.

Fig. 3 is a longitudinal section of a portion of the machine shown in Figs. 1 and 2 taken along line 3—3 of Fig. 1, some pears being shown in various stages of feeding during the operation of the machine.

Fig. 4 is an enlarged longitudinal section of a portion of the machine taken along line 4—4 of Fig. 2 and showing a pear in various positions during feeding and orientation thereof.

Fig. 5 is a cross section of a feed chute taken along line 5—5 of Fig. 4.

Fig. 6 is a side view of a modified form of feed and orienting chute, certain portions being broken away while others are shown in section.

Fig. 7 is a plan view of the feed and orienting chute of Fig. 6 taken along line 7—7 thereof.

Fig. 8 is a bottom view of the feed and orienting chute of Fig. 6 taken along line 8—8 thereof.

Fig. 9 is a longitudinal section through the feed and orienting chute taken along line 9—9 of Fig. 7, the chute being shown in its inclined position as installed in the machine in conjunction with a portion of its supporting and actuating mechanism, certain parts of which are shown in section while others are illustrated in elevation.

Fig. 10 is a front view of the feed and orienting chute taken in the direction arrows 10—10 of Fig. 7, a pear being shown as it enters the chute.

Fig. 11 is a rear view of the chute taken along line 11—11 of Fig. 7, a pear being shown in the front end of the chute.

Fig. 12 is an enlarged vertical section of a portion of the machine taken along line 12—12 of Fig. 2.

Fig. 13 is a side elevation of a portion of Fig. 12 taken along line 13—13 thereof.

Figs. 14 and 15 are diagrammatic views illustrating the operation of the feed chute assembly of the machine.

Fig. 16 is a perspective view of the automatically adjustable chute shown in Figs. 6 to 11 inclusive.

Fig. 17 is a section taken along the line 17—17 of Fig. 6.

Fig. 18 is a sectional view taken along the line 18—18 of Fig. 6.

The pear feeding and orienting mechanism of the present invention comprises a feed and orienting chute assembly 3 (Figs. 1, 2 and 3) into which individual pears are deposited in timed intervals by any appropriate feeding device such as for instance a conveyor or elevator 2 while the pears discharged from the chute assembly 3 are deposited thereby in oriented position into a fruit holder or pocket such as for instance the feed or transfer mechanism 4.

The elevator 2 (Figs. 1, 2 and 3) comprises a plurality of transverse rows of feed cups 44 mounted on transverse bars 43 in turn carried by endless chains 41 and 42 trained around sprockets 38 and 39. The sprockets 38 and 39 are keyed to a shaft 24 rotatably mounted in bearings 19 and 22 of standards 17 and 18.

Keyed to the shaft 24 is a sprocket 103 which is driven by means of a sprocket chain 104 either by a separate motor or directly by the fruit handling or processing machine in conjunction with which the feeding and orienting mechanism of the present invention is employed.

During the operation of the elevator 2, the cups 44 thereof (Fig. 3) are advanced through a supply hopper 107 containing a promiscuous mass of pears so that each cup removes a single pear, feeds the same to and discharges the same into the chute assembly 3.

Each cup 44 is provided with spaced rolls 91 and 92 and front wall portions 74 and 76 spaced from each other as shown at 77 (Fig. 2). During the conveyance of the pears by the cups 44 from the hopper 107 to the chute assembly 3 the pears are oriented by the rolls 91 and 92 and cups 44 until the neck ends of the pears are disposed above the space 77 between the front wall portions of the cups.

The construction and operation of the elevator mechanism 2 has been specifically described in said Patent No. 2,581,634, and reference may be had to the same for a complete understanding thereof.

The chute assembly 3 comprises a plurality of open ended feed and orienting chutes 151 and 152 arranged adjacent each other in alternate order (Fig. 1). All of the chutes are of identical construction with the only exception that the chutes 151 are considerably longer than the chutes 152. Therefore, the description of the construction of only one chute 151 will be sufficient for all.

The chute 151 (Figs. 1, 2, 3, 4 and 5) is of substantially tubular configuration and is open at its top over the entire length thereof as shown at 153 (Fig. 1). The wall portions 154 and 156 of the chute adjacent its open top 153 are bent upwardly and outwardly as shown in Fig. 5. The bottom portion 157 of the chute is provided with a rectangular guide channel 158 which extends longitudinally of the chute over the entire length of the bottom 157 (Figs. 1 and 4). The front end of the guide channel 158 is closed by a plate 159 provided with a tongue 161 projecting forwardly from the front end of the bottom 157 of the chute toward the elevator mechanism 2 in slightly declined position relative to the chute. Positioned behind the plate 159 and secured to the bottom 157 of the chute is an abutment block 162. This block closes a further portion of the channel 158, projects slightly above the bottom 157 and has an upper surface 163 which is curved in conformity with the bottom surface 157 of the chute. The front edge 164 of the abutment block 162 is adapted to engage the bulb portion of pears deposited sidewise with the bulb portion in leading position into the chute 151 by the elevator mechanism 2, as shown in dotted lines at b' in Fig. 3, so as to effect turning of these pears as they gravitate toward the rear or discharge end 166 of the chute to dispose the stem ends of the pears in leading position in which the same are subsequently maintained by their contact with the chute and their reception in the guide channel 158 thereof to thereby effect discharge of the pears stem end first from the chute 151. The pears discharged by the elevator 2 bulb end down into the chute, as shown in full lines at a' in Fig. 3, topple readily over with their stem ends into leading position as they gravitate down the chute without the assistance of the abutment 162 and are maintained in this position by the chute and the guide channel 158 for discharge stem end first therefrom.

The side wall portions 171 and 172 of the chute 151 as well as the upwardly and outwardly bent portions 154 and 156 thereof are flared outwardly toward the front end of the chute, as shown at 173 and 174 (Fig. 1), and terminate into outwardly flared and upwardly inclined guide walls 176 and 177 projecting from the front end of the chute which straddle the cups 44 of the elevator 2 as they pass the same (Figs. 1, 3 and 4).

The guide walls 176 and 177 and the curved portions 154 and 156 of the chute 151 are adapted to guide the stem end of the fruit toward the center of the chute and to facilitate the entry of the pear into the tubular portion of the chute in such a manner that when the pear is turned with its stem end into leading position either with or without assistance by the abutment block 162 during the downward gravitation of the pear along the chute, in a manner as previously referred to herein, the stem end of the fruit will enter the guide channel 158 whereby the fruit is maintained in oriented position as it gravitates through the chute and is discharged therefrom.

The tongue 161 is so constructed and arranged that it will enter the opening 77 in the front end of the elevator cups 44 cooperating therewith and permit passage of the cups 44 without interference therewith.

Each of the feed and orienting chutes 151 and 152 is supported in rearwardly declined position on a shaft 26 by means of supporting brackets 181 adjustably mounted on the shaft 26 but normally held in fixed position thereon by means of set screws 182. The shaft 26 is slidably mounted in bearings 21 and 23 supported by the standards 17 and 18, respectively.

The long feed and orienting chutes 151 are rearwardly declined in such a manner as to feed the pears oriented thereby stem end first into fruit receiving pockets 186 of the pear feeding device 4, while the short feed and orienting chutes 152 are rearwardly declined in such a manner as to feed the pears oriented thereby stem end first into fruit receiving pockets 188 of the feed device 4 (Figs. 1 and 3). The angular disposition of the chutes 151 and 152 being such as to assure gravitation of the pears therethrough and proper discharge therefrom. By loosening and subsequently tightening the set screws 182 the angularity of the chutes may be adjusted as desired.

The construction of the feed or transfer mechanism 4, only fragmentarily shown in Figures 1, 2, 3, and 4, corresponds to that disclosed in Patent No. 2,431,310, issued November 25, 1947. In general, this feed mechanism 4 comprises a group of pockets 186a and 188a designated group I and a group of pockets 186b and 188b designated group II (Figs. 1, 14 and 15). Each of these pockets comprises two separate pivotally mounted members 190 and 191 forming an open bottomed substantially frusto conical cup which is opened and closed in timed relation with the operation of the fruit receiving means of a fruit preparation machine associated therewith (not shown).

The fruit receiving pockets 186a and 188a of group I are simultaneously opened and closed under the control of an actuating arm 192; while the pockets 186b and 188b of group II are opened and closed simultaneously under the control of an actuating arm 193. The actuating arms 192 and 193 are operated in timed relation by the fruit preparation machine in connection with which the transfer mechanism 4 is used. Both groups of pockets I and II are alternately operated. However, their operation is such that there is a considerable period during which the pockets of both groups are closed and ready to receive fruit as will be apparent from my copending application above referred to.

As previously stated, the chutes 151 and 152 are mounted in alternate order on the transversely movable shaft 26 and it should be further noted that the chutes are so arranged and spaced with respect to each other that when the large chutes 151 are in alignment with the pockets 186a and 186b and the cups 44 of the elevator mechanism 2 (Figs. 1 and 14), the short chutes 152 are out of alignment with the cups 44 and the fruit receiving pockets 188a and 188b. After the pears have been fed in oriented position to the pockets 186a and 188a by the chute 151 the whole feed chute assembly 3 is transversely shifted in the direction of arrow 191a (Fig. 1) so as to align the short feed chutes 152 with the elevator cups 44 of the elevator mechanism 2 and the pockets 188a and 188b of the feed mechanism 4 into which the next pears are fed (Fig. 15). Thereupon the feed chute assembly 3 is returned to its original position as shown in Figs. 1 and 14 and in this manner the cycle of operation of the feed chute assembly repeats and continues during the operation of the machine.

The shifting of the feed chute assembly 3 in the manner as above described is effected by a rotary cam 194 (Figs. 1, 2, and 12) which is fixed on the shaft 24 for rotation therewith in the direction of arrow 195 in Figs. 1 and 12. The rotary cam 194 is provided with a groove 196 within which a cam roller 197 (Fig. 12) rotatably mounted on an arm 198 is received. The arm 198 is mounted on the shaft 26 and is fixed thereto by means of a key 199. Rotatably mounted on the free end 201 of arm 198 is a roller 202 (Figs. 12 and 13) which is received within a guide slot 203 of a transversely extending guide bracket 204 disposed parallel to shaft 26 and forming an integral part of the standard 18 previously referred to. The cam groove 196 of the rotary cam 194 is undulated in such a manner as to shift the arm 198, the shaft 26 and the feed chute assembly 3 carried thereby transversely back and forth from the position shown in Fig. 14 to the position shown in Fig. 15 in timed relation with the operation of the conveyor mechanism 2 and the feed mechanism 4 to effect alternate feeding of pears to the pockets 186a, 186b, and 188a, 188b, in the manner above referred to. During the back and forth movement of the feed chute assembly 3, the roller 202 travels back and forth in the guide slot 203 of bracket 204 but prevents rotation of arm 198, shaft 26, and assembly 3.

The pears are normally discharged blossom end down from the cups 44 of the elevator 2 and are deposited stem end up between the flared extensions 176 and 177 at the receiving ends of the chutes 151 so that they fall with their blossom ends upon the tongues 161 of the chutes, as shown in full lines at a' in Fig. 3. The flared extensions 176 and 177 of each feed chute 151 guide the stem end of the pear toward the center of the chute, while the momentum imparted upon the pear during its discharge from the cup 44 and the inclination of the chute to cause the pear to topple over on its side whereby the stem end of the pear is disposed into leading position, as shown at c in Fig. 3. Thereupon, the pear laying on its side slides downward along the chute and discharges stem end first therefrom.

Any pears, however, discharged from the elevator cups sidewise into the chute with their blossom ends disposed in leading position, as shown in dotted lines at b' in Fig. 3, are guided into the chute by the flared extensions 176 and 177 as they slide downwardly along the chute. During the downward travel of these pears, the bulb or blossom end thereof strikes against the front edge 164 of the abutment block 162, as shown in full lines at d in Fig. 4, whereby the downward movement of the blossom end of the pear is retarded. In view of the momentum imparted upon the fruit during its discharge from the elevator cups, the fruit is caused to topple over in the direction of arrow 206 (Fig. 4) as soon as the downward movement of the bulb or blossom end thereof is retarded by the abutment block 162 whereby the pear is disposed with the stem end thereof in leading position with the pear laying on its side, as shown at e in Fig. 4, in which position the pear now gravitates downward the inclined chute and finally discharges stem end first therefrom.

In either case, however, as the pear topples over, the stem end thereof is guided by the upwardly and outwardly curved portions 154 and 156 of the chute until the pear is received entirely within the feed chute 151 and the stem end thereof is disposed in leading position. During this orientation of the fruit, the stem end thereof drops into the guide channel 158 in the bottom 157, as shown at 207 (Fig. 4), which maintains the pear with its stem end in leading position and guides the pear during its further travel through the chute so that the pear leaves the discharge end 166 of the chute stem end down, as shown at 208 (Fig. 4), and subsequently slides stem end first into the pocket 186a disposed therebeneath in closed or fruit receiving position. Due to the conical configuration of the pocket 186a, the fruit is disposed and supported stem end down therein as shown in dotted lines at 209 in Fig. 4.

The diameter of the tubular chutes 151 and 152 is larger than the diameter of the fruit but is such that when a pear has been completely received therein and is approximately in a position as shown at e (Fig. 4), the pear is prevented from turning sidewise or turning over about its stem end. However, the diameter of the chutes is sufficiently large to permit free gravitation of the pears through the chute. Since the pears vary considerably in size, it is therefore necessary to grade the pears so as to assure that they are neither too small nor too large with respect to the diameter of the chutes. Chutes of different diameter are employed for small, medium size, or large pears, as will be obvious to those skilled in the art.

After the pears discharged from one transverse row of cups 44 of the elevator 2 into the chutes 151 have been oriented and delivered by said chutes to the pockets 186a and 186b, and while the next transverse row of elevator cups approaches its discharge position, the feed chute assembly 3 is shifted from its position shown in Figs. 1 and 14 to its position shown in Fig. 15 by the rotary cam 194 in the manner as previously described herein.

When the feed chute assembly arrives in the position as shown in Fig. 15, the short feed chutes 152 are now aligned with the succeeding row of elevator cups 44 and the pockets 188a and 188b, so that when the pears carried by these succeeding elevator cups are discharged therefrom they are deposited into the short feed chutes 152 wherein they are oriented and by which they are conveyed to the pockets 188a and 188b in the same manner as previously described in connection with chutes 151 and pockets 186a and 186b.

After a pear has been fed to each pocket 186 of the feed mechanism 4, all pockets 186b and 188b of group II are rapidly opened and closed to discharge the pears stem end down therefrom into one group of fruit receiving and holding means of a pear processing machine, as shown in said Patent No. 2,431,310, and thereafter all pockets 186a and 188a of group I of the feed mechanism 4 are rapidly opened and closed to discharge the pears stem end down from the same into another group of fruit receiving and holding means of a pear processing machine, while the feed chute assembly 3 is returned to the position shown in Figs. 1 and 14 and the cycle of operation of the machine of the present invention repeats and continues in the same manner as described herein.

It has been mentioned in the above that by using the feed chutes as shown at 151 and 152 it is necessary to grade the fruit and that chutes of different diameter must be employed for small, medium size, or large pears. Therefore, when changing from one to another size of pears it is necessary to exchange the feed chutes. Since the exchange of feed chutes is time consuming and may be undesirable, a modified form of feed and orienting chute, as shown in Figs. 6 to 11, inclusive and 16, 17 and 18 may be employed instead of the feed chutes 151 and 152 previously described herein. It being understood, however, that while only a short modified chute structure 216 which corresponds in length to the short chutes 152 has been shown herein, longer chutes of the same construction which correspond in length to the chutes 151 are employed in alternate order therewith in the same manner as the short and long chutes 151 and 152, previously described herein, as will be apparent to those versed in the art.

The chute 216 (Figs. 6 to 11, 16, 17 and 18) comprises an open ended trough 217 of substantially semi-circular confiuration in cross section and an automatically adjustable floating guide structure 218 associated therewith. The trough 217 is of sufficient width to permit passage of the largest pears therethrough and the bottom portion 219 thereof is provided with a guide channel 221 of substantially rectangular configuration in cross section which extends over the entire length of the bottom in the center thereof. Mounted within the guide channel 221 and projecting from the front end of the trough 217 in a forwardly declined position relative thereto is a tongue 222, which is adapted to extend into opening 77 and into the space between the rolls 91 and 92 of the elevator 2 so that the cups 44 may freely pass the same. The rear end of the tongue 222 is formed into a protuberance 223 extending transversely of the bottom portion 219 (Figs. 7 and 9) and projecting into the trough 217 slightly above the bottom portion thereof. The forward ends of the side walls of the trough 217 designated 224 and 225 respectively terminate into outwardly flared and laterally inclined extensions 226 and 227 which project forwardly beyond the curved body portion of the chute.

The floating guide 218 comprises two side members 228 and 229 connected together by a stiff arched wire 231, the ends of which are welded at 232 and 233, respectively (Fig. 7), to the side members 228 and 229 of the guide 218. The arched connecting wire 231 clears the gap between the side members 228 and 229 by a height sufficient to permit free movement of the stem end of a pear tumbling over endwise along the trough 217 beneath the wire 231 toward the stem end down position shown in dot-dash lines in Fig. 9.

Each of the side members 228 and 229 has a transversely disposed flat portion 236 adapted to rest on the upper edges of the trough 217 when the floating guide 218 is in its normal position with no fruit in the trough. The inner marginal edge of each flat portion 236 is bent upwardly and outwardly to form a curved inner guide wall 237 which is substantially co-extensive with the sides of the trough 217 for guiding the necks of the pears (Figs. 10, 11, 16, 17 and 18) as the pears are toppled over endwise in the trough. The outer marginal edge portion of each of the side members 228 and 229 is bent downwardly to form a flat vertical side flange 238.

A tapered forward end portion 241 of each of the side members 228 and 229 is bent upwardly to lie at an acute angle to the flat portion 236 thereof, the angle between the flat side portion 236 and the upwardly bent tapered forward portion 241 being such that the forward portions 241 will rest on the inclined upper edges of the forwardly extending trough entrance end portions 224 and 225 when the flat portions 236 of the side members 228 and 229 are resting on the upper edges of the trough side walls. Each tapered forward end portion 241 of the side members is flat and the inner edge thereof tapers outwardly toward the straight vertical side flange 238, coming to a rounded point 241a at its forward end.

A forwardly tapered stem end guiding and centering plate 242 is brazed onto the inner edge of each upwardly offset forward portion 241 of the side members 228 and 229. Each stem end guiding and centering plate 242 extends rearwardly a sufficient distance to overlap the forward edge of the reversely curved guide wall portion 237. Each of the two centering and guide plates 242 has a vertical intermediate portion 244 (Figs. 16 and 17), an outwardly curved upper marginal edge portion 247, and an outwardly bent lower portion 243. The lower edge of the lower portion 243 has a slight clearance from the forwardly extending trough side wall portions 226 and 227 to prevent binding thereon when the floating guide assembly 218, of which these tapered front end guide portions are parts, is resting on the upper edges of the trough as shown in Figs. 6, 10, 11, 16, 17 and 18.

The entire floating guide structure 218, comprising the side members 228 and 229, the arched connecting wire 231, and the forward tapered centering and guide plates 242 has a floating connection with the side walls 224 and 225 of the trough 217 through a pair of links 251 and 252 (Figs. 6, 8, 9, and 18). The forward ends of the links 251 and 252 are pivotally connected to the vertical side flanges 238 of the side members 228 and 229 by pivot pins 253 and 254, respectively (Figs. 6 and 7). The rearward ends of the links 251 and 252 are similarly pivotally connected to the trough side walls 224 and 225, respectively, by pivot pins 256 and 257. Each link has a rearwardly extending portion 258 which is adapted to engage a stop abutment 261 on each side wall of the trough to limit upward pivotal movement of the links, and thereby to limit the upward movement of the floating guide assembly.

The chute 216 is provided with a supporting bracket 181a, which is of the same construction as the supporting bracket 181 previously referred to herein and by means of which the chute is secured in rearwardly declined position to the transversely movable shaft 26 (Fig. 9).

When the modified form of the chute 216 is employed in connection with the machine of the present invention, a plurality of short and long chutes of this type are arranged in alternate order on the shaft 26 in rearwardly declined positions to form a chute assembly which is similar to and operated in the same manner as the chute assembly 3 previously described herein.

All of the chutes 216 function in the same manner, and, therefore, only the description of the function of one chute 216 is given herein.

When a pear is discharged blossom end down by one of the feed cups 44 of the elevator 2 into the front end of the chute 216, the blossom end of the fruit is received by the tongue 222 and is guided by the flared extensions 226 and 227 toward the center of the chute. Thereupon in view of the declination of the chute, the pear gravitates into the chute and topples over with its stem end into leading position in the same manner, as previously described herein in connection with chute 151.

When a pear, however, is deposited sidewise into the chute 216 with the blossom end of the pear in leading position the pear gravitates downwardly in this position until the blossom end strikes the abutment 223. This engagement of the abutment 223 with the blossom end retards the downward movement thereof so that in view of the momentum of the fruit the same topples over whereby the pear is disposed with its stem end in leading position in the same manner as set forth in the above in connection with chute 151. In either case, however, the neck portion of the pear is received between the guide plates 242 and is guided thereby and the curved guide walls 237 as the pear topples over as above described (Figs. 9, 10, and 11).

When a small pear is deposited into the chute 216, the guide 218 remains in its normal or lowermost position as shown in Fig. 6. However, if a pear of medium or large size is deposited into the chute 216, the bulb portion of the fruit engages the lower sides 243 of the stem end centering and guide plates 242 on the forward ends of the side members 228 and 229 of the floating guide assembly 218 (Figs. 9, 10, 11, 16 and 17) and lifts the front end of the guide 218 sufficiently, as shown in full lines in Fig. 9, to permit entry of the pear into the trough 217. As the fruit topples over, as shown in dotted lines in Fig. 9, and gravitates toward the discharge end 266 of the chute the neck of the pear is guided during the endwise tipping of the pear between the curved inner edge portions 237 of the side members 228 and 229. As soon as the pear is disposed with its stem end in leading position, the stem end of the pear enters the guide channel 221 which retains the same in this position during further travel of the fruit through the chute. The guide walls 244 and the curved edges 247 assist in properly guiding the fruit and as soon as the oriented pear is completely received within the chute 216 and is about in the position as shown in dot-dash lines at 269 (Fig. 9) and of such size that its bulb portion engages the top portions 236, the guide 218 pivots about the pivot pins 253 and 254 from its full line position to the position shown in dot-dash lines in Fig. 9 whereby the front end of the guide is lowered and the rear end of the guide is lifted to permit further passage of the pear through the chute and subsequent discharge of the fruit stem end first therefrom. It should be noted, however, that the position of the guide 218 varies continuously as the fruit gravitates toward the discharge end of the chute. As soon as the pear leaves the chute, or if the bulb portion of the pear does not engage the top portions 236 after it has passed the front end of the guide, the guide 218 returns by its own gravity to its original position as shown in Fig. 6.

The top portions 236 which either engage the bulb portion of the pear or are slightly spaced therefrom, depending upon the size of the fruit, prevent turning of the pear about its stem end after orientation of the pear and during its further travel through the chute.

The entire guide structure 218 is of very light weight so that the same is easily lifted by the fruit and does not noticeably affect the gravitation of the pear through the chute while in engagement therewith.

From the above it will, therefore, be seen that when the modified chute structure 216 is used, pears of all sizes may be fed in properly oriented position, i. e., stem end first into the pockets 186 and 188 of the feed mechanism 4 or into any other type of fruit receiving means of a fruit handling or processing machine without changing of the chutes of the chute assembly 3 for different sizes of fruit.

While I have shown and described a preferred embodiment of my invention, such invention is capable of modification and variation without departing from the spirit and scope thereof as defined in the claims appended hereto.

Having thus described my invention, what I claim as new and desire to protect by Letters Patent is:

1. In a pear feeding and orienting apparatus, a chute to receive and guide pears along a downwardly sloping path, said chute having spaced downwardly converging side walls disposed to engage and align a pear with its stem blossom axis lengthwise of the chute, and an abutment provided between said side walls to engage and turn a pear end to end to dispose its stem end in leading position during movement of the pear down the chute.

2. In a pear feeding and orienting apparatus, a chute disposed to receive and guide pears along a downwardly sloping plane, said chute having spaced downwardly converging side walls disposed to engage and align a pear with its stem blossom axis lengthwise of the chute, and an abutment provided between said side walls within said chute to engage and turn a pear end to end to dispose its stem end in leading position during movement of the pear down the chute, said side walls being provided with spaced guides to receive and guide the stem end of a pear therebetween when the pear is engaged by said abutment and turned end to end to dispose the stem end thereof in leading position.

3. In a pear feeding and orienting apparatus, a chute to receive and guide pears along a downwardly sloping plane, said chute having spaced downwardly converging side walls disposed to engage and align a pear with its stem blossom axis lengthwise of the chute, an abutment provided between said side walls to engage and turn a pear end to end to dispose its stem end in leading position for movement down the chute, and a guide channel extending longitudinally along the bottom of the chute beyond said abutment to receive and guide the stem end of a pear.

4. In a pear feeding and orienting apparatus, a chute having open receiving and discharge ends and disposed in a downwardly sloping position, said chute having spaced side walls disposed to engage and align a pear with its stem blossom axis lengthwise of the chute, and an abutment provided between said side walls to engage and turn a pear endwise to dispose its stem end in leading position, the portions of said side walls adjacent the receiving end of the chute being formed and arranged to define an inwardly converging opening to receive a pear.

5. In a pear feeding and orienting apparatus, a chute to receive and guide pears along a downwardly sloping plane, said chute having spaced downwardly converging side walls disposed to engage and align a pear with its stem blossom axis lengthwise of the chute, an abutment provided between said side walls to engage and turn a pear end to end to dispose its stem end in leading position during the movement of the pear down the chute, and spaced interconnected guide members defining a passageway extending longitudinally of the chute and movable relative thereto in a vertical plane medially between the side walls to receive and guide a pear stem end during movement of the latter from a trailing to a leading position within the chute and to prevent subsequent endwise turning of the pear.

6. In a pear feeding and orienting apparatus, an inclined chute to receive and guide pears along a downwardly sloping plane, said chute having spaced downwardly converging side walls disposed to engage and align a pear with its stem blossom axis lengthwise of the chute, an abutment provided between said side walls within the chute to engage and turn a pear end to end to dispose its stem end in leading position during its movement down the chute, spaced interconnected guide members defining a passageway extending longitudinally of the chute to receive and guide a pear stem end during movement of the latter from trailing to leading position within the chute, and connecting links supporting said guide members for vertical and pivotal movement relative to said chute responsive to engagement of pears of various sizes, said links being pivotally connected at one of their ends to said guide members and at their other ends to said side walls.

BURTON C. COONS.

REFERENCES CITED

The following references are of record in the file of this patent:

UNITED STATES PATENTS

| Number | Name | Date |
|---|---|---|
| 478,263 | Moss | July 5, 1892 |
| 876,291 | Blakeslee | Jan. 7, 1908 |
| 928,725 | Wing | July 20, 1909 |
| 1,527,337 | Wilcox | Feb. 24, 1925 |
| 2,004,349 | Schwab | June 11, 1935 |